United States Patent [19]

Kageyama et al.

[11] Patent Number: 4,880,292

[45] Date of Patent: Nov. 14, 1989

[54] TRANSMISSION VIEWING SCREEN OF IMAGE PROJECTOR APPARATUS

[75] Inventors: Hitoshi Kageyama; Toshikazu Suzuki; Keijiro Sakamoto; Tetsuo Kyogoku; Masayuki Nino, all of Osaka, Japan

[73] Assignee: Minolta Camera Kabushiki Kaisha, Osaka, Japan

[21] Appl. No.: 222,797

[22] Filed: Jul. 22, 1988

[30] Foreign Application Priority Data

Jul. 24, 1987 [JP] Japan ................................ 62-186105
Jul. 31, 1987 [JP] Japan ................................ 62-193376

[51] Int. Cl.$^4$ .......................................... G03B 21/60
[52] U.S. Cl. ................................................. 350/128
[58] Field of Search ............... 350/123, 124, 127, 128, 350/130, 3.85, 162.2, 162.24; 340/705, 980; 358/60; 434/303

[56] References Cited

U.S. PATENT DOCUMENTS

| | | | |
|---|---|---|---|
| 2,313,947 | 3/1943 | Klinkum | 350/127 |
| 2,800,054 | 7/1957 | Allison | 350/127 X |
| 4,147,408 | 4/1979 | Plummer | 350/128 |
| 4,165,920 | 8/1979 | Brown | 350/127 X |
| 4,185,901 | 1/1980 | Behr | 350/127 X |
| 4,418,986 | 12/1983 | Yata et al. | 350/128 |
| 4,439,027 | 3/1984 | Shioda et al. | 350/128 X |
| 4,469,402 | 9/1984 | Yata et al. | 350/128 |
| 4,512,631 | 4/1985 | VanBreemen | 350/123 X |
| 4,558,922 | 12/1985 | Smith | 350/127 |
| 4,708,435 | 11/1987 | Yata et al. | 350/129 |

FOREIGN PATENT DOCUMENTS

| | | |
|---|---|---|
| 45-20851 | 8/1970 | Japan . |
| 58-57120 | 4/1983 | Japan . |
| 58-176628 | 10/1983 | Japan . |
| 59-9649 | 1/1984 | Japan . |
| 59-127030 | 7/1984 | Japan . |
| 59-128528 | 7/1984 | Japan . |
| 61-208041 | 9/1986 | Japan . |

*Primary Examiner*—Richard A. Wintercorn
*Attorney, Agent, or Firm*—Price, Gess & Ubell

[57] ABSTRACT

A light-transmission viewing screen for displaying an optical image from a beam of light projected thereon along a predetermined path of light provided rearwardly of the screen, the viewing screen having a virtual center axis extending toward a viewer's viewing position, the light-transmission viewing screen comprising a transparent or translucent transmission screen plate through which to transmit the beam of light, and a transmission grating located on at least a portion of one of the surfaces of the transmission screen plate for diffracting the beam of light toward a location substantially aligned with the virtual center axis of the viewing screen when the beam of light is transmitted through the transmission grating.

51 Claims, 13 Drawing Sheets

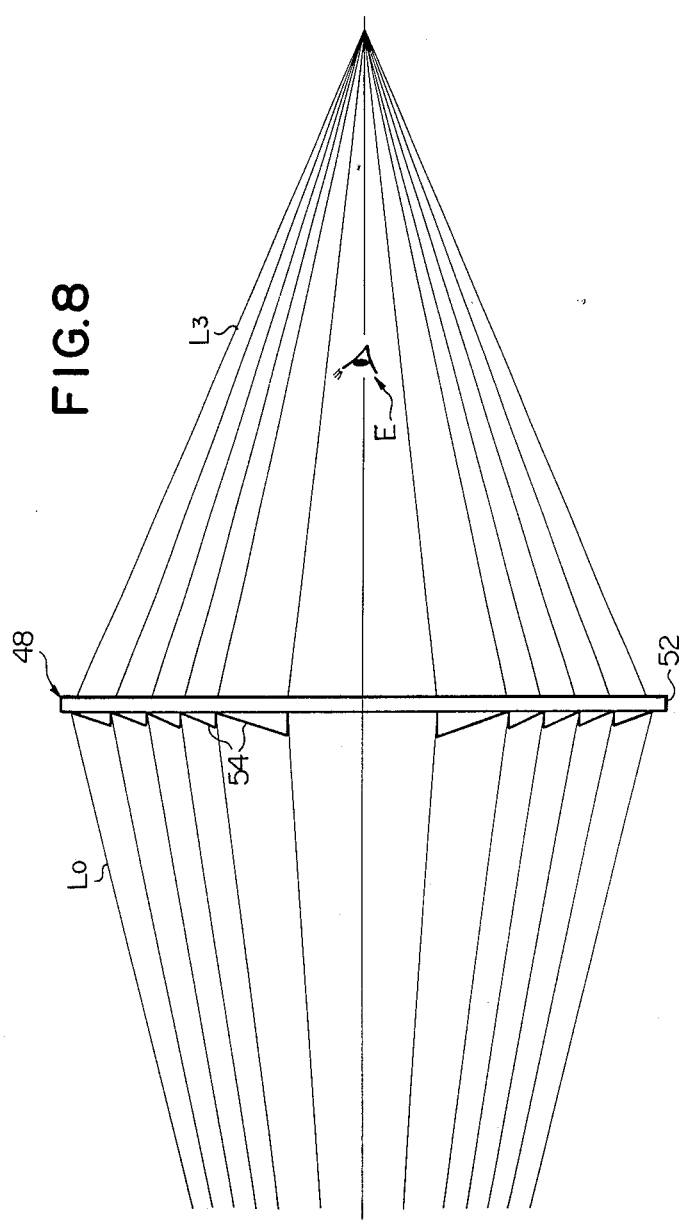

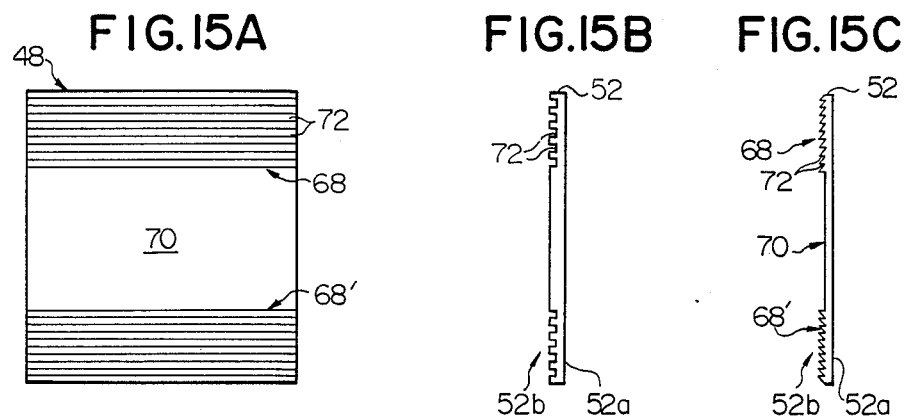
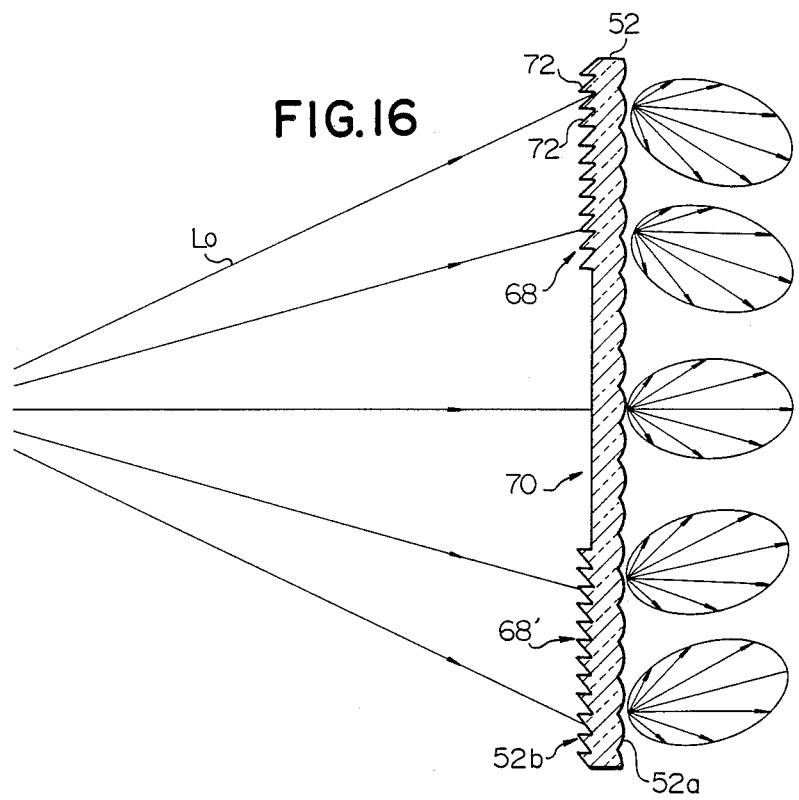

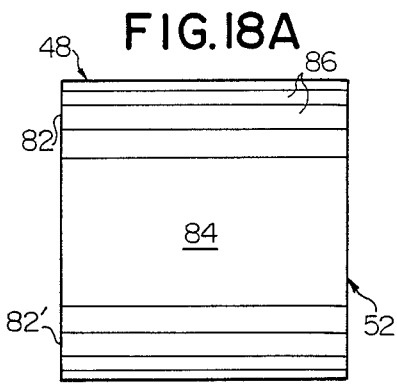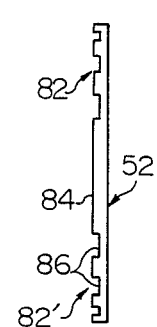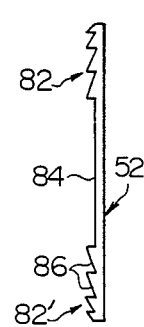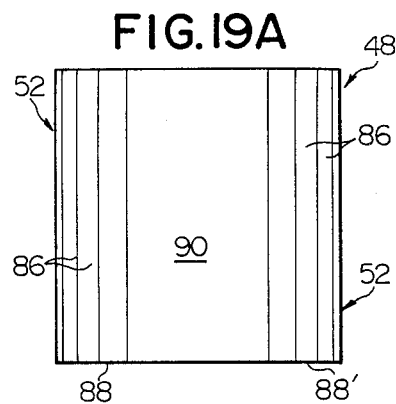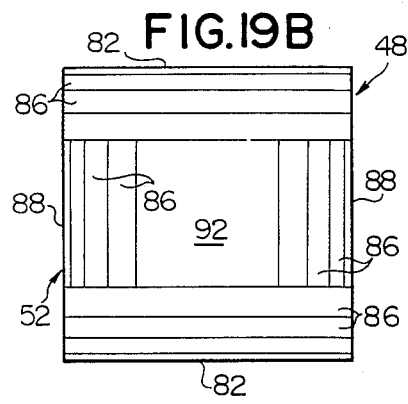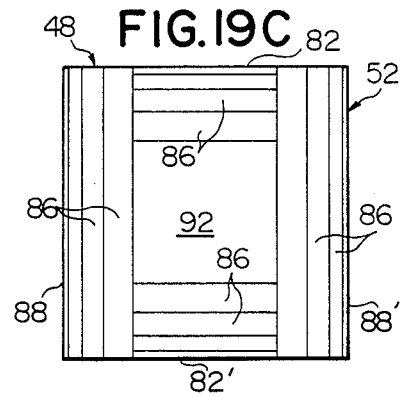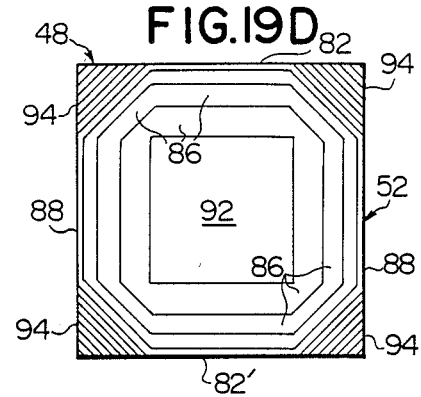

TRANSMISSION VIEWING SCREEN OF IMAGE PROJECTOR APPARATUS

FIELD OF THE INVENTION

The present invention relates to a light transmission viewing screen for an image projector apparatus such as a microfilm reader or a microfilm reader/printer apparatus, or a video projection television receiver.

BACKGROUND OF THE INVENTION

An image projector apparatus such as a microfilm strip reader or reader/printer apparatus or a video projection television receiver uses a viewing screen of the transmission type through which an image projected onto the viewing screen is to be viewed by a viewer situated in front of the screen. A prior-art transmission viewing screen however has a problem in that the beam of light transmitted through the viewing screen is caused to diffuse in various directions from the screen and diverges outwardly from the field of view. The image to be viewed through the viewing screen thus tends to be blurred toward the edges of the viewing screen and has marginal areas which could not be viewed clearly from the viewer.

For the purpose of overcoming such a problem inherent in a prior-art transmission viewing screen, a transmission viewing screen for an image projector apparatus is proposed which is provided with light converging means for the screen. The light converging means is implemented by a Fresnel lens attached to or formed on the inner surface of the viewing screen so that the beam of light transmitted through the viewing screen is caused to converge past the screen to form brighter and clearer image areas along the edges of the screen. A transmission viewing screen of this nature however has a drawback in that the successive steps in the Fresnel lens form stripes or fringes in the image frame to be viewed through the transmission viewing screen and impairs the quality of the image, particularly, the resolution of the image.

The present invention contemplates elimination of these drawbacks of known transmission viewing screens for image projector apparatus and, accordingly, it is an important object of the present invention to provide an improved transmission viewing screen capable of producing an image having clear and bright marginal areas and an excellent resolution.

SUMMARY OF THE INVENTION

In accordance with one outstanding aspect of the present invention, there is provided a light-transmission viewing screen for displaying an optical image from a beam of light projected thereon along a predetermined path of light provided rearwardly of the screen, the viewing screen having a center axis located with respect to the path of light, the light-transmission viewing screen comprising (a) a transparent or translucent transmission screen plate through which to transmit the beam of light, the transmission screen plate having substantially parallel opposite surfaces, and (b) a transmission grating located on at least a portion of one of the surfaces of the transmission screen plate for diffracting the beam of light toward a location substantially aligned with the center axis of the viewing screen when the beam of light is transmitted through the transmission grating.

In a light-transmission viewing screen thus constructed in accordance with the present invention, the transmission grating may be formed by a portion of one of the surfaces of the transmission screen plate or may be formed separately of the screen plate and is securely attached to least a portion of one of the surfaces of the transmission screen plate.

The transmission grating may comprise a succession of concentric grooves formed in least a portion of one of the surfaces of the transmission screen plate and having a common center axis which is substantially coincident with the center axis of the viewing screen. Alternatively, the transmission grating may comprise a succession of substantially straight parallel grooves formed in least a portion of one of the surfaces of the transmission screen plate.

BRIEF DESCRIPTION OF THE DRAWINGS

The drawbacks of a prior-art transmission viewing screen and the features and advantages of a transmission viewing screen according to the present invention will be more clearly understood from the following description taken in conjunction with the accompanying drawings in which like reference numerals designate similar or corresponding members, element, areas and portions and in which:

FIG. 8 is a schematic view showing a divergent beam of light transmitted through the transmission viewing screen and caused to diffract inwardly toward the common center axis of the grooves forming the transmission grating in the viewing screen shown in FIGS. 6A and 6B;

FIG. 15A is a frontal plan view of a ninth preferred embodiment of a transmission viewing screen according to the present invention as incorporated in the microfilm reader/printer apparatus illustrated in FIG. 5;

FIG. 15B is a cross sectional view taken along line XV—XV in FIG. 15A;

FIG. 15C is a view similar to FIG. 15B but shows a modification of the embodiment illustrated in FIGS. 15A and 15B;

FIG. 16 is a schematic diagram showing to an enlarged scale the angular distribution of the component beams of light transmitted through the transmission viewing screen in the arrangement shown in FIGS. 15A and 15B;

FIG. 18A is a frontal plan view of a tenth preferred embodiment of a transmission viewing screen according to the present invention as incorporated in the microfilm reader/printer apparatus illustrated in FIG. 5;

FIG. 18B is a cross sectional view taken along line XVIII—XVIII in FIG. 18A;

FIG. 18C is a view similar to FIG. 18B but shows a modification of the embodiment illustrated in FIGS. 18A and 18B; and FIGS. 19A to 19D are frontal plan views showing other modifications of the embodiment illustrated in FIGS. 18A and 18B.

DESCRIPTION OF THE PRIOR ART

Figure 1:
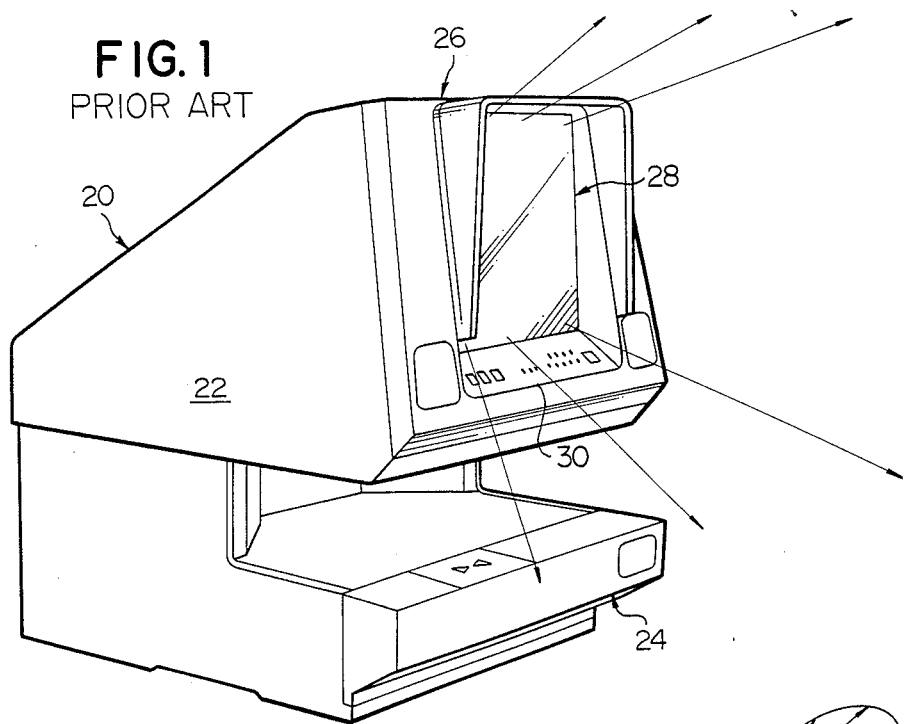
FIG. 1 is a perspective view showing an overall external appearance of a microfilm reader/printer apparatus using a prior-art viewing screen of the type to which the present invention generally appertains.

FIG. 1 shows the external appearance of a microfilm reader apparatus 20 incorporating a known transmission viewing screen. The microfilm reader apparatus 20 includes a housing structure 22 having accommodated therein a lower mechanical and optical module 24 and an upper display module 26 positioned over the mechanical and optical module 24. The upper display module 26 includes a generally rectangular viewing screen 28 located at the front end of the display module 26. The lower mechanical and optical module 24 includes a control panel 30 provided on the front wall of a lower portion of the housing structure 22.

Figure 2:
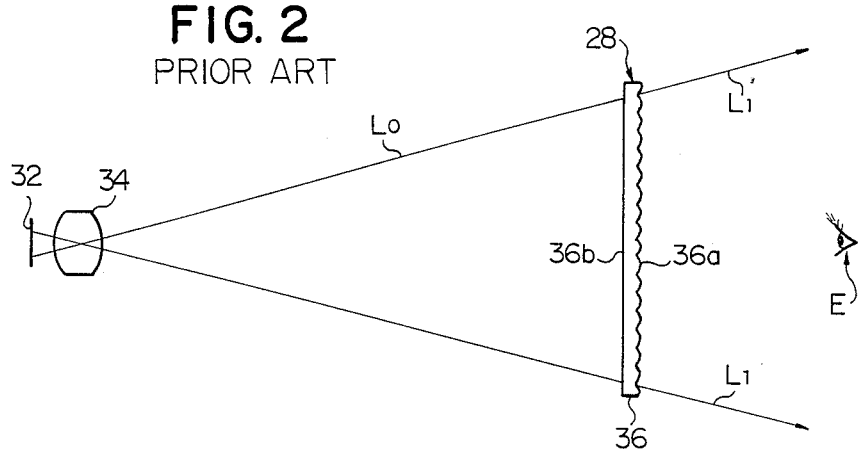
FIG. 2 is a schematic side elevation view showing a typical example of the general arrangement of a transmission viewing screen with respect to the path of light from a projection lens.

A microfilm strip, represented by a line 32 in FIG. 2, has carried thereon a series of image frames, one of which is irradiated with a collimated beam of light. The beam of light transmitted through the microfilm strip 32 and thus carrying image information read from the irradiated image frame is passed through and diverges from a projection lens 34. The divergent information-carrying beam of light Lo thus passed through the projection lens 34, which also forms part of the optical system of the apparatus 20, is reflected from the reflector mirror located within the display module 26 and is projected onto the viewing screen 28 as indicated by Lo in FIG. 2. A magnified version of the original image information recorded on the image frame of the microfilm strip 32 is thus reproduced through the viewing screen 28 located at the front end of the apparatus 20 and can be viewed by a viewer E who may be situated in front of the viewing screen 28.

Figure 3:
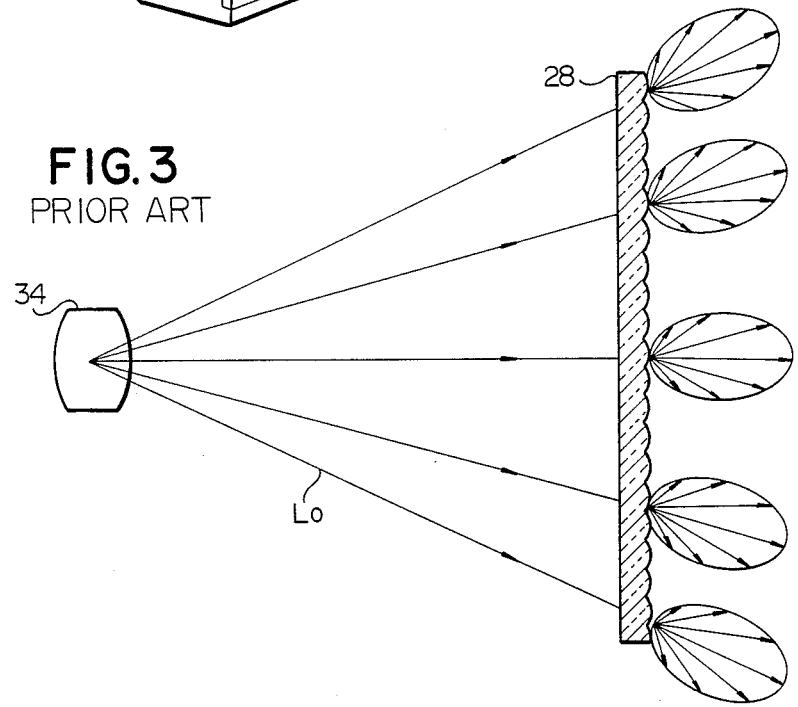
FIG. 3 is a schematic diagram showing to an enlarged scale the angular distribution of the component beams of light transmitted through the transmission viewing screen in the arrangement shown in FIG. 2.

As schematically illustrated in part to an enlarged scale in FIG. 3, the transmission viewing screen 28, which per se is known, includes a generally flat transparent or translucent screen plate 36 having a matted outer surface 36a and a smooth inner surface 36b. A beam of light Lo diverging from the projection lens 34 is transmitted through the screen plate 36 and is caused to diffuse in various directions from the screen plate 36 as will be seen from the elliptical diagrams shown. Each of these elliptical diagrams is a vector representation of the angular distribution of some component beams of light diffused from the screen plate 36, the major axis of the ellipsis being coincident with the direction of the beam of light incident on the screen plate 36. The divergent beam of light transmitted through the transmission viewing screen 28 thus remains divergent as shown in FIG. 2 and has end portions diverting outwardly from the field of view in front of the transmission viewing screen 28. Accordingly, the image frame to be viewed through the viewing screen 28 tends to be blurred toward the edges of the screen 28 and has marginal areas which could not be viewed clearly by the viewer E.

Figure 4:
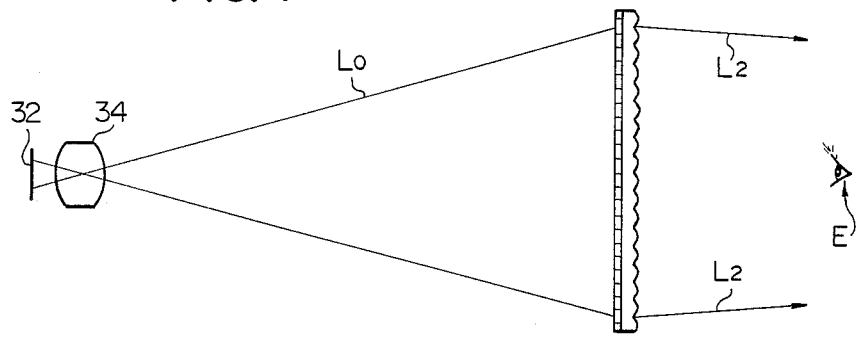
FIG. 4 is a view similar to FIG. 2 but shows another example of the general arrangement of a transmission viewing screen with respect to the path of light from a projection lens.

In an attempt to eliminate such a drawback of a prior-art transmission viewing screen, a transmission viewing screen for an image projector apparatus is proposed which is characterized by the provision of light converging means 38 for the viewing screen as shown in FIG. 4. Examples of an image projector apparatus of this type is taught in Japanese Provisional Patent Publications (Kokai) No. 59-127030 and No. 59-128528. In a image projector apparatus disclosed in each of these publications, the light converging means 28 is implemented by a Fresnel lens attached to or formed on the inner surface 36b of the screen plate 36 so that the beam of light transmitted through the viewing screen 28 is caused to converge as indicated by arrows $L_2$ in FIG. 4 to form brighter and accordingly clearer image areas along the edges of the screen 28. A transmission viewing screen of this nature is however still objectionable in that the succession of steps in the Fresnel lens results in formation of stripes or fringes in the image frame to be viewed through the transmission viewing screen 28 and gives rise to a decrease in the resolution of the image.

As has been noted, the present invention aims at elimination of these drawbacks of known transmission viewing screens for image projector apparatus.

DESCRIPTION OF THE PREFERRED EMBODIMENTS

Figure 5:
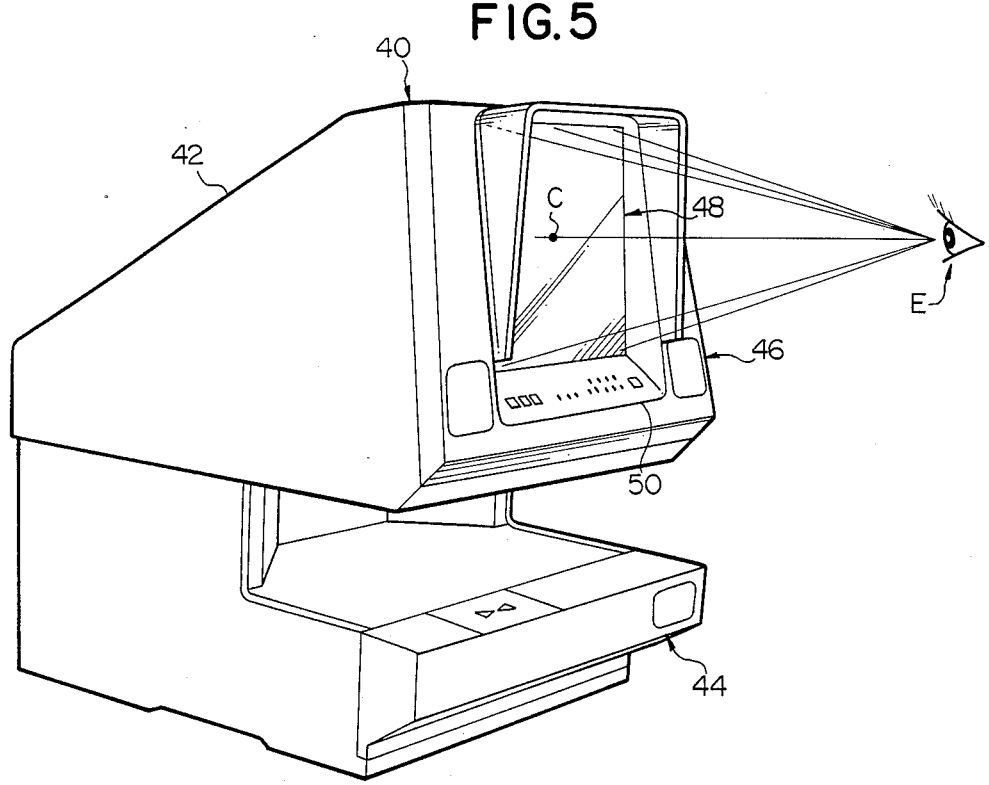
FIG. 5 is a perspective view showing an overall external appearance of a microfilm reader/printer apparatus which exemplifies an image projector apparatus into which an improved transmission viewing screen according to the present invention may be incorporated.

FIG. 5 shows the external appearance of a microfilm reader apparatus 40 which exemplifies an image projector apparatus of the type incorporating a transmission viewing screen embodying the present invention. The microfilm reader apparatus 40 herein shown is assumed to form part of a microfilm reader-printer system which per se is well known in the art and comprises a housing structure 42 having accommodated therein a lower mechanical and optical module 44 and an upper display module 46 positioned over the mechanical and optical module 24. The upper display module 46 comprises a generally rectangular transmission viewing screen 48 located at the front end of the display module 46 and a reflector mirror (not shown) which forms part of the optical system of the apparatus 40. The lower mechanical and optical module 44 comprises a control panel 50 provided on the front wall of a lower portion of the housing structure 42.

First Preferred Embodiment

Figure 6A:
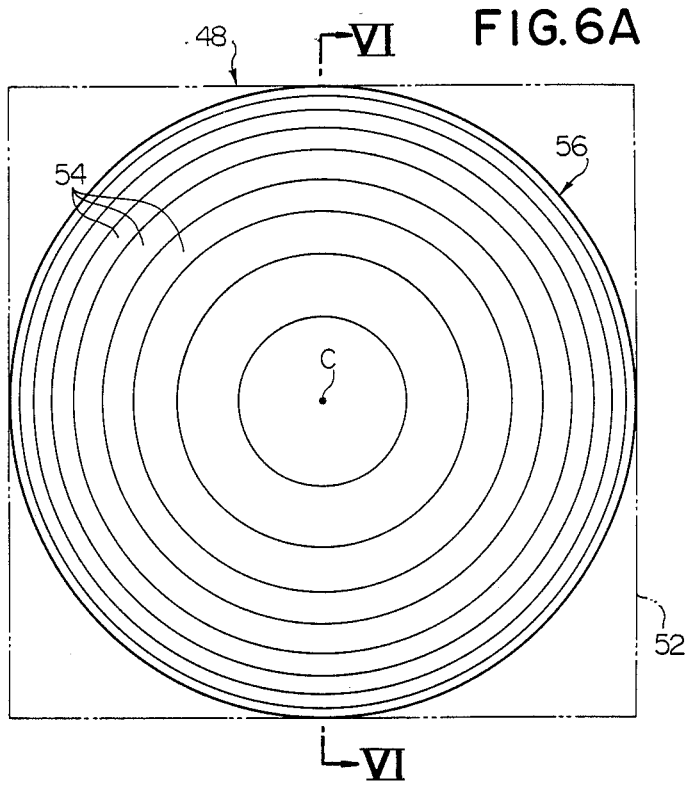
FIG. 6A is a frontal plan view of a first preferred embodiment of a transmission viewing screen according to the present invention as incorporated in the microfilm reader/printer apparatus illustrated in FIG. 5.
Figure 6B:
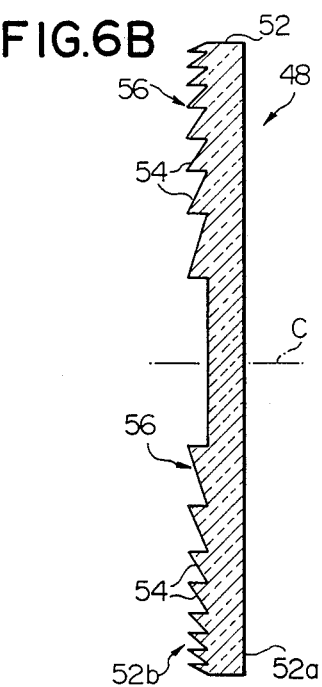
FIG. 6B is a cross sectional view taken along line VI—VI in FIG. 6A.

As illustrated to an enlarged scale in FIGS. 6A and 6B, a first preferred embodiment of a transmission viewing screen according to the present invention comprises a transparent or translucent, generally rectangular transmission screen plate 52 having a flat smooth or matted outer surface 52a and a grooved inner surface 52b. The grooved inner surface 52b of the screen plate 52 is formed with a succession of concentric grooves 54 having a common center axis C at the center of the screen plate 52. Each of the concentric grooves 54 has a generally triangular or check-mark-shaped cross sectional configuration and is defined by an annular side wall substantially parallel with the common center axis C of the grooves 54 and an annular facet which is inclined radially of the groove 54 toward a plane parallel with the smooth or matted outer surface 52a of the screen plate 52.

The concentric grooves 54 are formed at pitches which define Fresnel zones and which thus decrease progressively from the outermost one of the grooves 54 toward the common center axis C of the grooves 54. The concentric grooves 54 thus forming Fresnel zones define in toto a circular transmission grating 56 having portions located adjacent the four sides or edges of the screen plate 52. The term "pitches" herein referred to is defined as the widths of the concentric grooves 54 or the distances between the adjacent steps which result from the individual concentric grooves 54. The concentric grooves 54 thus forming the circular transmission grating 56 are blazed so that the intensity of light of the first-order spectrum is greater than those of the other spectra. The transmission screen plate 52 thus shaped can be manufactured in quantity from a replica prepared from a mother mother matrix as will be readily understood by those familiar with the art.

The pitch of the n-th concentric groove 54 from the common center axis C is expressed in terms of the distance Rn of the groove 54 from the common center axis C of the grooves 54 by the relationship $$Rn = (\lambda \cdot f \cdot n)^{\frac{1}{2}} \qquad (1)$$

where is the wavelength of the light transmitted through the transmission grating 56 and f is the focal distance of the transmission grating 56. The pitch or width Pn of the n-th concentric groove 54 is thus given by the equation $$Pn = Rn + 1 - R_n = \frac{(\cdot f)}{[\lambda \cdot f \cdot (n+1)]^{\frac{1}{2}} + (\lambda \cdot f \cdot n)^{\frac{1}{2}}} \qquad (2)$$

This equation (2) indicates that the pitches or widths of the concentric grooves 54 defined by the relationship (1) decrease progressively from the common center axis C of the grooves 54.

The concentric grooves 54 thus formed in the screen plate of the transmission viewing screen embodying the present invention are preferably ruled so that the pitches of the grooves 54 are less than 50 microns. Results of the experiments which the present inventors have conducted show that no observable diffraction of light takes place with a transmission screen plate 52 formed with concentric grooves having pitches more than 50 microns. With the pitches more than 50 microns, the angles of diffraction and the intensities of diffracted light are reduced to values such that the diffracted beams of light could not produce a properly focussed and clearly visible image through the transmission screen plate 52. The results of the experiments further show that the light incident on the screen plate 52 produces a clearly visible bright image through the transmission screen plate 52 with no fringes appearing in the image when the transmission screen plate 52 is formed with concentric grooves 54 having pitches less than 50 microns.

In the experiments conducted by the present inventors was used a beam of light with a wavelength of 550 nanometers and a 300 mm by 300 sized transmission screen plate 52 which is typical for use in an ordinary microfilm reader/printer apparatus. In order that the transmission grating 56 formed in such a transmission screen plate 52 have focusing characteristics equivalent to those of a lens having a focal distance of 800 mm, it is necessary that the concentric grooves 54 be formed to have a pitch of the order of 2.1 microns at a distance of 110 mm from the common center axis C, a pitch of the order of 1.5 micron at a distance of 150 mm from the axis C, and a pitch of the order of 1.0 micron at a distance of 215 mm from the axis C. If the transmission grating 56 formed in a similarly sized transmission screen plate 52 is to be designed to have enhanced focusing characteristics equivalent to those of a lens having a focal distance of 270 mm, it will be required that the concentric grooves 54 be formed to have pitches of the orders of 0.68, 0.49 and 1.0 micron at the distances of 110 mm, 150 mm and 215 mm, respectively, from the common axis C of the grooves 4. It may be added that the outermost one of the concentric grooves 54 formed in a transmission screen plate 52 sized 420 mm by 584 mm has a pitch of 0.85 mm.

The above analysis into the focusing characteristics of a transmission viewing screen embodying the present invention suggests that the concentric grooves 54 formed in the screen plate 52 should be preferably ruled so that the pitches of the grooves 54 range from 0.1 micron to 10 microns.

Figure 7A:
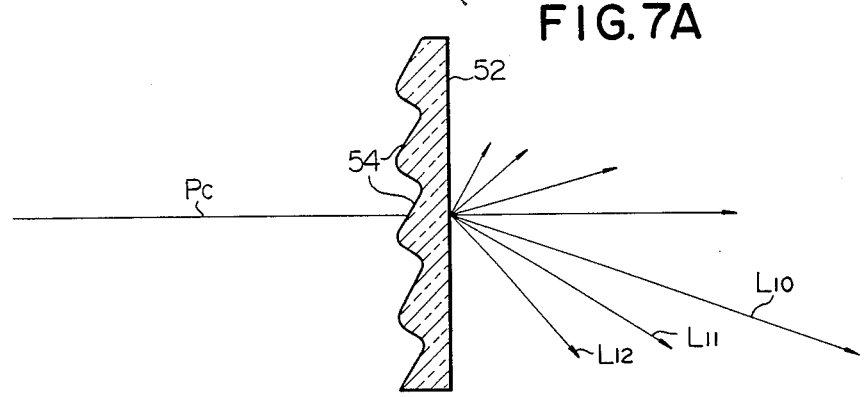
FIG. 7A is a fragmentary cross sectional view showing to an enlarged scale a portion of the transmission viewing screen illustrated in FIGS. 6A and 5B wherein the concentric grooves forming the transmission grating are blazed so that each of the grooves has an asymmetrical cross sectional configuration.
Figure 7B:
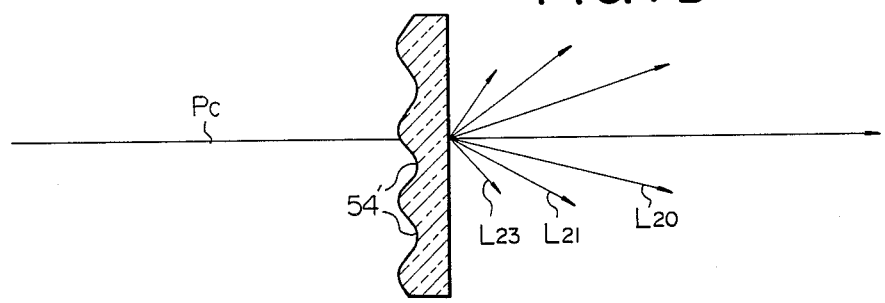
FIG. 7B is a view similar to FIG. 7A but shows a portion of a transmission viewing screen having concentric grooves each having a symmetrical cross sectional configuration.

The concentric grooves 54 forming the transmission grating 56 are blazed so that each of the grooves 54 has a cross sectional configuration which is asymmetrical with respect to a plane $P_C$ which passes through the center of the groove 54 as indicated in FIG. 7A. The grooves 54 each having such a cross sectional configuration are useful for achieving higher intensities of diffracted light of the first, second and third orders as indicated by $L_{10}$, $L_{11}$ and $L_{12}$, respectively, in FIG. 7A in contrast to the intensities of diffracted light as indicated by $L_{20}$, $L_{21}$ and $L_{22}$ in FIG. 7B for grooves 54' each having a symmetrical cross sectional configuration.

Figure 6C:
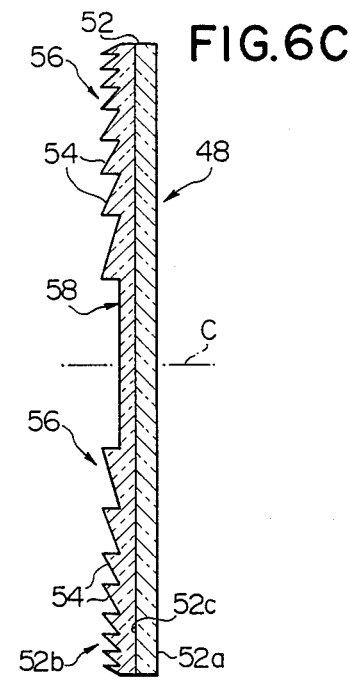
FIG. 6C is a view similar to FIG. 6B but shows a modification of the transmission viewing screen illustrated in FIGS. 6A and 5B.

While the transmission grating 56 in the transmission viewing screen embodying the present invention is formed by a surface portion of the screen plate 52 and is thus integral with the screen plate 52, such a transmission grating 56 may be formed separately of the screen plate 52 per se by a transparent or translucent member 58 attached to the flat smooth inner surface, 52c, of the screen plate 52 as shown in FIG. 6C. In view, furthermore, of the fact that the distribution of light is higher toward the center axis of a transmission screen plate, it is preferable that a center area of the transmission grating 56 be left plain with no concentric grooves located in a circular area having a radius of less than 100 mm (= Rn) from the common center axis C of the concentrical grooves 54.

When a divergent beam of light incident on the transmission screen plate 52 having the transmission grating 56 formed by a Fresnel zone plate is transmitted through the concentric grooves 54 blazed in the screen plate 52, the light is caused to diffract radially inwardly toward the common center axis C of the grooves 54 as shown in FIG. 8. The viewer E who may be situated in front of the transmission viewing screen 48 of the microfilm reader/printer apparatus is thus enabled to clearly recognize the bright image produced by the convergent beam of light $L_3$ emanating from the viewing screen 48. The concentrical grooves 54 forming the transmission grating 56 being formed preferably at pitches less than 50 microns or more preferably within a range of 0.1 micron to 10 microns, no visible fringes which would otherwise give rise to a decrease in the resolution will be produced in the image produced by the beam of light passed through the grooves 54.

Second Preferred Embodiment

Figure 9A:
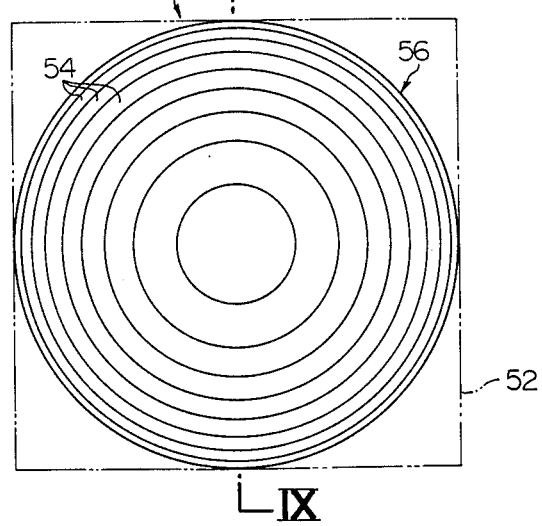
FIG. 9A is a frontal plan view of a second preferred embodiment of a transmission viewing screen according to the present invention as incorporated in the microfilm reader/printer apparatus illustrated in FIG. 5.
Figure 9B:
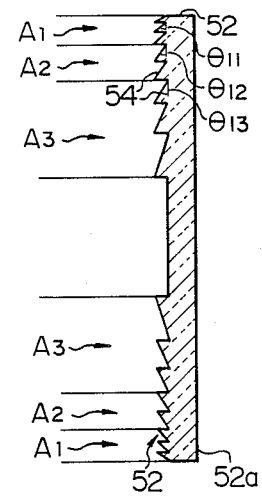
FIG. 9B is a cross sectional view taken along line IX—IX in FIG. 9A.

Turning to FIGS. 9A and 9B, the transmission screen plate 52 forming part of a second preferred embodiment of a transmission viewing screen according to the present invention also has a flat smooth or matted outer surface 52a and a grooved inner surface 52b. The transmission screen plate 52 herein shown is basically similar to the first preferred embodiment of a transmission viewing screen according to the present invention in that the grooved inner surface 52b of the screen plate 52 is formed with a succession of concentric grooves 54 arranged at pitches which define Fresnel zones and which thus forms a circular transmission grating 56 having portions located adjacent the four sides or edges of the screen plate 52. Thus, the pitches of the concentric grooves 54 in the screen plate 52 herein shown also decrease progressively from the outermost one of the grooves 54 toward the common center axis C of the grooves 54 as will be seen from FIG. 9A. In addition, the grooves 54 are formed so that each of the grooves 54 has a cross sectional configuration which is asymmetrical with respect to the plane $P_C$ which passes through the center of the groove 54 as noted with reference to FIG. 7A.

In the second preferred embodiment of the present invention, the concentric grooves 54 forming the transmission grating 56 are grouped into those of a radially outermost annular zone $A_1$, those of a radially intermediate annular zone $A_2$ and those of a radially innermost annular zone $A_3$ as shown in FIG. 9B. The concentric grooves 54 in these three adjacent zones $A_1$, $A_2$ and $A_3$ are blazed such that the grooves 54 in each of the zones $A_1$, $A_2$ and $A_3$ have equal blaze angles which are different from those of the grooves 54 in another zone. The term "blaze angle" herein used refers to the angle which the annular facet defining each of the concentric grooves 54 makes with a plane parallel with the smooth or matted outer surface 52a of the screen plate 52. In the arrangement shown in FIGS. 9A and 9B, the blaze angle $\theta_{11}$ of the grooves 54 in the radially outermost annular zone A1 is larger than the blaze angle $\theta_{12}$ of the grooves 54 in the radially intermediate annular zone $A_2$, and the blaze angle $\theta_{12}$ of the grooves 54 in the radially innermost annular zone A2 in turn is larger than the blaze angle $\theta_{13}$ of the grooves 54 in the radially innermost annular zone $A_3$. Hence, there is established the following relationship among the blaze angles $\theta_{11}$, $\theta_{12}$ and $\theta_{13}$ $$\theta_{11} > \theta_{12} > \theta_{13}$$

Third Preferred Embodiment

Figure 10A:
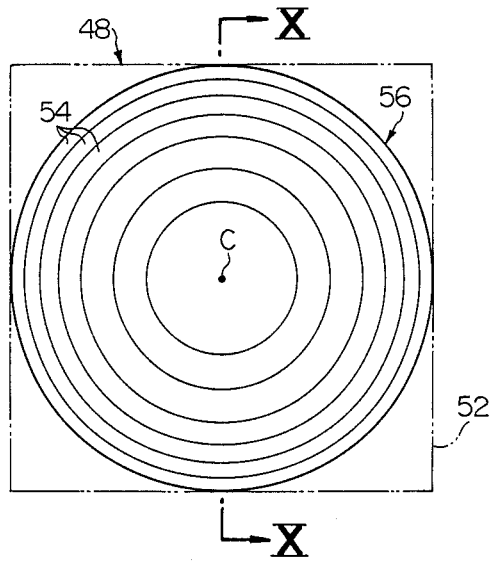
FIG. 10A is a frontal plan view of a third preferred embodiment of a transmission viewing screen according to the present invention as incorporated in the microfilm reader/printer apparatus illustrated in FIG. 5.
Figure 10B:
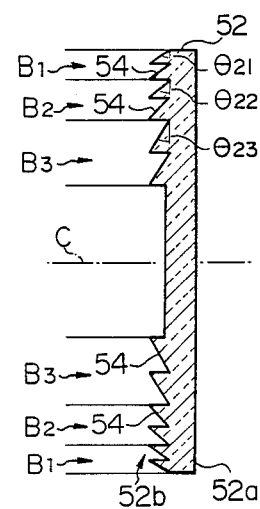
FIG. 10B is a cross sectional view taken along line X—X in FIG. 10A.

Referring to FIGS. 10A and 10B, the transmission screen plate 52 providing a third preferred embodiment of a transmission viewing screen according to the present invention also has a flat smooth or matted outer surface 52a and a grooved inner surface 52b. The transmission screen plate 52 herein shown is also basically similar to the first preferred embodiment of a transmission screen plate according to the present invention in that the grooved inner surface 52b of the screen plate 52 is formed with a succession of concentric grooves 54 which define a circular transmission grating 56 having portions located adjacent the four sides or edges of the screen plate 52.

In the transmission viewing screen providing the third preferred embodiment of the present invention, the concentric grooves 54 forming the transmission grating 56 are grouped into those of a radially outermost annular zone $B_1$, those of a radially intermediate annular zone $B_2$ and those of a radially innermost annular zone $B_3$ as shown in FIG. 10B. The concentric grooves 54 in these three adjacent zones $B_1$, $B_2$ and $B_3$ are blazed such that the grooves 54 in each of the zones $B_1$, $B_2$ and $B_3$ have equal pitches and blaze angles which are different from those of the grooves 54 in another zone. The blaze angle $\theta_{21}$ of the grooves 54 in the radially outermost annular zone $B_1$ is larger than the blaze angle $\theta_{22}$ of the grooves 54 in the radially intermediate annular zone $B_2$, and the blaze angle $\theta_{22}$ of the grooves 54 in the radially innermost annular zone $B_2$ in turn is larger than the blaze angle $\theta_{23}$ of the radially innermost annular zone $B_3$. Hence, there is established the following relationship among the blaze angles $\theta_{21}$, $\theta_{22}$ and $\theta_{23}$:

$$\theta_{21} > \theta_{22} > \theta_{23}$$

Figure 10C:
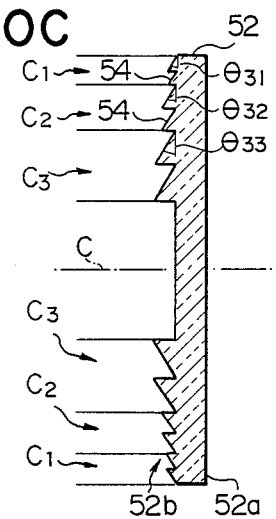
FIG. 10C is a view similar to FIG. 10B but shows a modification of the embodiment illustrated in FIGS. 10A and 10B.

FIG. 10C shows a modification of the transmission screen plate 52 hereinbefore described with reference to FIGS. 10A and 10B. In the modified transmission screen plate 52 illustrated in FIG. 10C, the concentric grooves 54 forming the transmission grating 56 are also grouped into those of a radially outermost annular zone $C_1$, those of a radially intermediate annular zone $C_2$ and those of a radially innermost annular zone $C_3$ The concentric grooves 54 in these three adjacent zones $C_1$, $C_2$ and $C_3$ are blazed such that the grooves 54 in each of the zones $C_1$, $C_2$ and $C_3$ have equal pitches which are different from those of the grooves 54 in another zone and equal blaze angles which are equal to those of the grooves 54 in another zone. Thus, among the blaze angles $\theta_{31}$, $\theta_{32}$ and $\theta_{32}$ of the grooves 54 in the annular zones $C_1$, $C_2$ and $C_3$, respectively, is established the following relationship:

$$\theta_{31} = \theta_{32} = \theta_{33}$$

In each of the embodiments of the present invention hereinbefore described with reference to FIGS. 10A, 10B and 10C, the grooves 54 are also formed in the screen plate 52 so that each of the grooves 54 has a cross sectional configuration which is assymetrical with respect to the plane $P_C$ which passes through the center of the groove 54 as noted with reference to FIG. 7A.

Fourth Preferred Embodiment

Figure 11A:
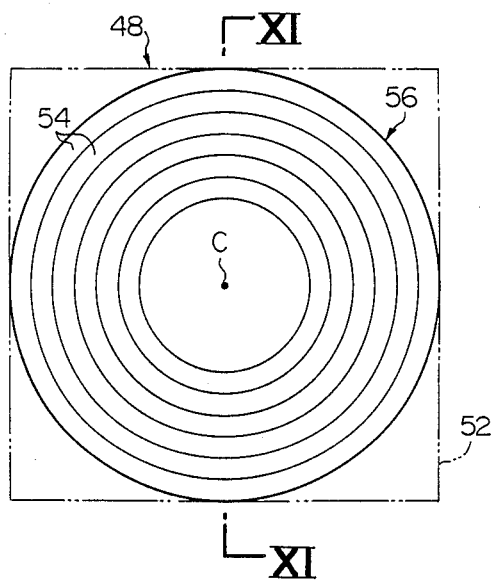
FIG. 11A is a frontal plan view of a fourth preferred embodiment of a transmission viewing screen according to the present invention as incorporated in the microfilm reader/printer apparatus illustrated in FIG. 5.
Figure 11B:
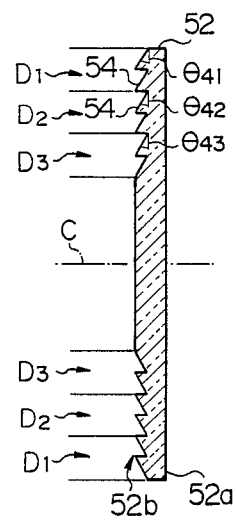
FIG. 11B is a cross sectional view taken along line XI—XI in FIG. 11A.

Turning to FIGS. 11A and 11B, the transmission screen plate 52 forming part of a fourth preferred embodiment of a transmission viewing screen according to the present invention also has a flat smooth or matted outer surface 52a and a grooved inner surface 52b. The transmission screen plate 52 herein shown is also basically similar to the first preferred embodiment of a transmission viewing screen according to the present invention in that the grooved inner surface 52b of the screen plate 52 is formed with a succession of concentric grooves 54 defining a circular transmission grating 56 having portions located adjacent the four sides or edges of the screen plate 52.

In the transmission viewing screen providing the fourth preferred embodiment of the present invention, the concentric grooves 54 forming the transmission grating 56 are grouped into those of a radially outermost annular zone $D_1$, those of a radially intermediate annular zone $D_2$ and those of a radially innermost annular zone $D_3$ as shown in FIG. 10D. The concentric grooves 54 in these three adjacent zones $D_1$, $D_2$ and $D_3$ are blazed such that the grooves 54 in each of the zones $D_1$, $D_2$ and $D_3$ have equal pitches which are equal to those of the grooves 54 in another zone and equal blaze angles which are different from those of the grooves 54 in another zone. The blaze angle $\theta_{41}$ of the grooves 54 in the radially outermost annular zone $D_1$ is larger than the blaze angle $\theta_{42}$ of the grooves 54 in radially intermediate annular zone $D_2$, and the blaze angle $\theta_{42}$ of the grooves 54 in the radially innermost annular zone $D_2$ in turn is larger than the blaze angle $\theta_{43}$ of the radially innermost annular zone $D_3$. Hence, there is established the following relationship among the blaze angles $\theta_{41}$, $\theta_{42}$ and $\theta_{43}$:

$$\theta_{41} > \theta_{42} > \theta_{43}$$

Figure 11C:
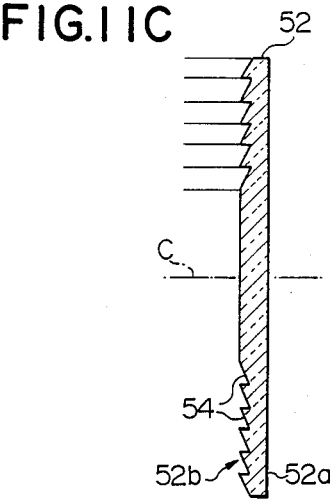
FIG. 11C is a view similar to FIG. 11B but shows a modification of the embodiment illustrated in FIGS. 11A and 11B.

FIG. 11C shows a modification of the transmission screen plate 52 hereinbefore described with reference to FIGS. 11A and 11B. In the modified transmission screen plate 52 illustrated in FIG. 11C, the concentric grooves 54 forming the transmission grating 56 are blazed such that all the grooves 54 have equal pitches and equal blaze angles.

In each of the embodiments of the present invention hereinbefore described with reference to FIGS. 11A, 11B and 11C, each of the grooves 54 has a cross sectional configuration which is asymmetrical with respect to the plane $P_C$ which passes through the center of the groove 54 as noted with reference to FIG. 7A.

Fifth Preferred Embodiment

Figure 12A:
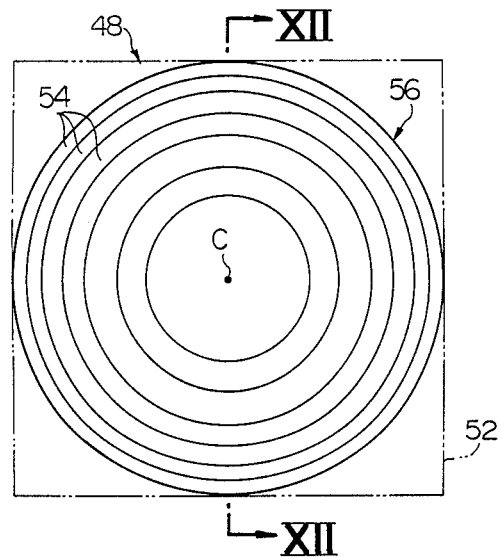
FIG. 12A is a frontal plan view of a fifth preferred embodiment of a transmission viewing screen according to the present invention as incorporated in the microfilm reader/printer apparatus illustrated in FIG. 5.
Figure 12B:
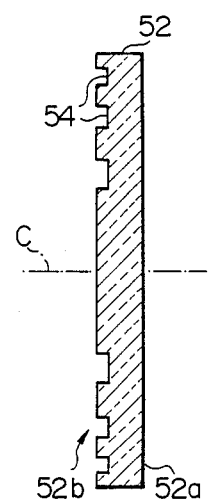
FIG. 12B is a cross sectional view taken along line XII—XII in FIG. 12A.

Referring to FIGS. 12A and 12B, the transmission screen plate 52 forming part of a fifth preferred embodiment of a transmission viewing screen according to the present invention also has a flat smooth or matted outer surface 52a and a grooved inner surface 52b. The grooved inner surface 52b of the screen plate 52 is formed with a succession of concentric grooves 54 arranged at pitches defining Fresnel zones which form a circular transmission grating 56 having portions located adjacent the four sides or edges of the screen plate 52.

While the concentric grooves 54 formed in each of the embodiments of the present invention which have thus far been described have generally triangular or checkmark-shaped cross sectional configurations, the concentric grooves 54 provided in the fifth preferred embodiment of the present invention have generally rectangular or U-shaped cross sectional configurations. Thus, each of the concentric grooves 54 formed in the transmission screen plate 52 shown in FIGS. 12A and 12B is defined by a pair of spaced annular side walls substantially parallel with the common center axis C of the grooves 54 and an annular bottom surface parallel with the smooth or matted outer surface 52a of the screen plate 52 and extending between the pair of side walls radially of the groove 54.

Sixth Preferred Embodiment

Figure 13A:
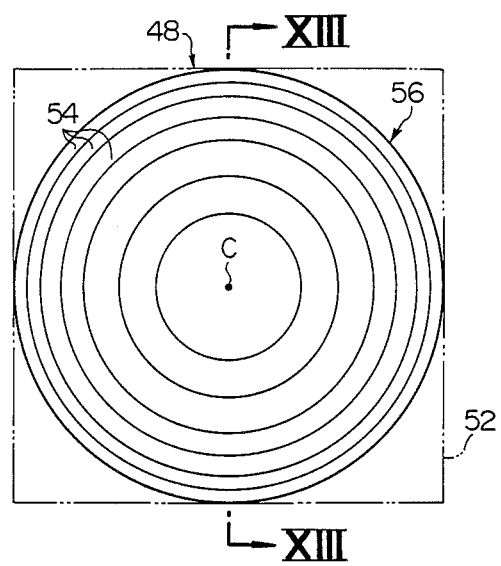
FIG. 13A is a frontal plan view of a sixth preferred embodiment of a transmission viewing screen according to the present invention as incorporated in the microfilm reader/printer apparatus illustrated in FIG. 5.
Figure 13B:
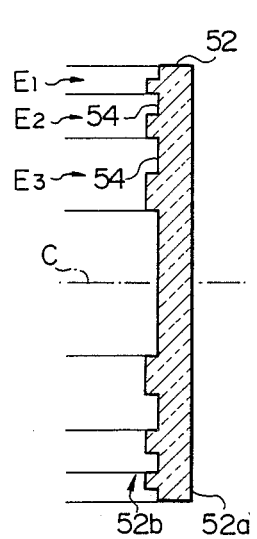
FIG. 13B is a cross sectional view taken along line XIII—XIII in FIG. 13A.

FIGS. 13A and 13B show a sixth preferred embodiment of a transmission viewing screen according to the present invention. The embodiment herein shown is a modification of the transmission screen plate 52 hereinbefore described with reference to FIGS. 12A and 12B. In this modified transmission screen plate 52, the concentric grooves 54 forming the transmission grating 56 are grouped into those of a radially outermost annular zone $E_1$, those of a radially intermediate annular zone $E_2$ and those of a radially innermost annular zone $E_3$ as shown in FIG. 13B. The concentric grooves 54 in these three adjacent zones $E_1$, $E_2$ and $E_3$ are located such that the grooves 54 in each of the zones $E_1$, $E_2$ and $E_3$ have equal pitches which different from those of the grooves 54 in another zone. More specifically, the pitches of the grooves 54 in the radially outermost annular zone $E_1$ are less than the pitches of the grooves 54 in the radially intermediate annular zone $E_2$, and the pitches of the grooves 54 in the radially innermost annular zone $E_2$ in turn are less than the pitches of the radially innermost annular zone $E_3$.

In the transmission viewing screen providing the sixth embodiment of the present invention hereinbefore described with reference to FIG. 13A and 13C, the concentrical grooves 4 in each of the annular zones $E_1$, $E_2$ and $E_3$ may be formed at pitches equal to the pitch of the groove located centrally of the particular zone and identical with the pitch to define a Fresnel zone.

The transmission grating 56 in each of the second to sixth preferred embodiments of the present invention as hereinbefore described has been assumed to be formed by a surface portion of the screen plate 52 and integral with the screen plate 52, such a transmission grating 56 may be formed separately of the screen plate 52 per se by a transparent or translucent member attached to the flat smooth or matted inner surface of the screen plate 52 though not shown in the drawings. Furthermore, a center area of the transmission grating 56 in each of the second to sixth preferred embodiments of the present invention is preferably left plain with no concentric grooves located in a circular area having a radius of less than 100 mm from the common center axis C of the concentrical grooves 54 as previously noted in connection with the embodiment of FIGS. 6A and 6B.

It may be herein further noted that the transmission grating 56 in each of the second to sixth preferred embodiments of the present invention as hereinbefore described is not capable of focusing an incoming beam of light into a small spot area as is the case with the embodiment described with reference to FIGS. 6A and 6B. This however will be more than offset by the advantage that the image resulting from the beam of light transmitted through the transmission grating 56 can be viewed clearly especially along marginal areas of the image as contemplated by the present invention. In any event, it is preferred that the concentric grooves 54 formed in the screen plate 52 be ruled so that the pitches of the grooves 54 are less than 50 microns or, more preferably, range from 0.1 micron to 10 microns whether the grooves 54 may be formed at pitches which define Fresnel zones or non-Fresnel zones.

Seventh and Eighth Preferred Embodiments

Figure 14A:
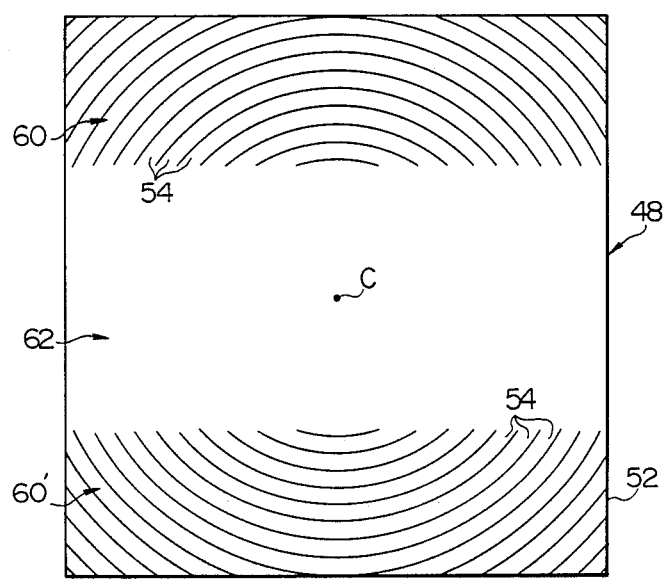
FIG. 14A is a frontal plan view showing a seventh preferred embodiments of a transmission viewing screen according to the present invention.
Figure 14B:
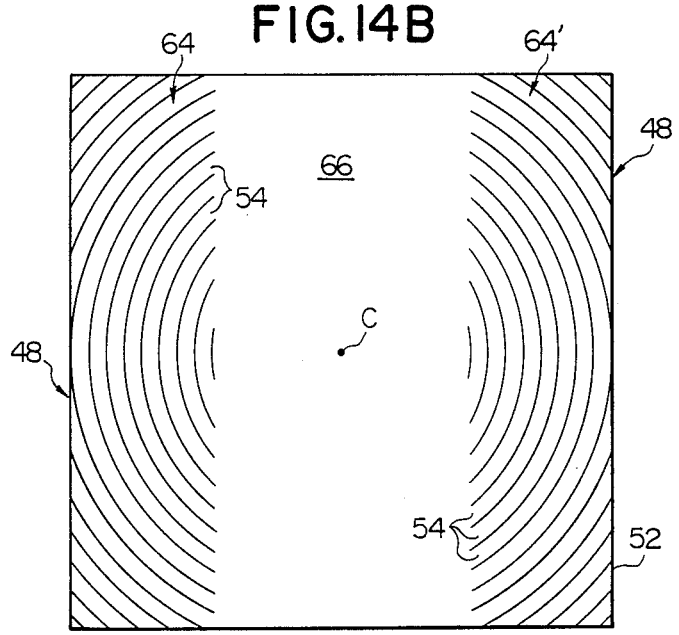
FIG. 14B is a view similar to FIG. 14A but shows an eighth preferred embodiments of a transmission viewing screen according to the present invention.

FIGS. 14A and 14B show seventh and eighth preferred embodiments of a transmission viewing screen according to the present invention. In each of the seventh and eighth preferred embodiments, a center area of the screen plate is left plain with no grooves formed therein in view of the fact that the distribution of light is higher toward the center axis of a transmission screen plate. Each of the embodiments shown FIGS. 14A and 14B is thus characterized in that the concentric grooves 54 formed at pitches defining Fresnel or non-Fresnel zones cover corner areas of the rectangular or generally square-shaped screen plate 52 and are absent in a vertically or horizontally intermediate area of the screen plate 52.

The transmission viewing screen illustrated in FIG. 14A has elongated upper and lower grooved transmission grating areas 60 and 60′ horizontally extending along the upper and lower edges, respectively, of the screen plate 52 each between the left and right edges of the screen plate 52 and a central area 62 vertically intervening between the upper and lower grooved transmission grating areas 60 and 60′ and devoid of the grooves 54. The transmission viewing screen illustrated in FIG. 14B has elongated left and right grooved transmission grating areas 64 and 64′ vertically extending between the upper and lower edges of the screen plate 52 along the left and right edges, respectively, of the screen plate 52 each between the upper and lower edges of the screen plate 52 and a central area 66 horizontally intervening between the left and right grooved transmission grating areas 64 and 64′ and devoid of the grooves 54. The grooves 4 formed in the upper and lower areas 60 and 60′ of the viewing screen illustrated in FIG. 14A and the grooves 54 formed in the left and right areas 64 and 64′ of the viewing screen illustrated in FIG. 14B may thus be more correctly referred to as "arcuate" grooves with each of the grooves 54 extending arcuately about the common center axis C of the grooves 54.

Ninth Preferred Embodiment

FIGS. 15A and 15B show a ninth preferred embodiment of a transmission viewing screen according to the present invention. The transmission viewing screen comprises a screen plate 52 having a flat smooth outer surface 52a and a grooved inner surface 52b. The grooved inner surface 52b of the screen plate 52 has elongated upper and lower grooved transmission grating areas 68 and 68′ extending horizontally along the upper and lower edges, respectively, of the screen plate 52 each between the left and right edges of the screen plate 52 and a central area 70 vertically intervening between the upper and lower grooved transmission grating areas 68 and 68′ and devoid of grooves to form the transmission grating. The embodiment herein shown is thus characterized in that the central area 70 between the upper and lower grooved transmission grating areas 68 and 68′ is left plain with no grooves formed in the area 70 in view of the fact that the distribution of light is higher in a center area than in marginal areas of the transmission viewing screen.

Each of the upper and lower grooved transmission grating areas 68 and 68′ is formed with straight, parallel grooves 72 extending horizontally between the left and right edges of the screen plate 52. These parallel grooves 72 are formed at equal pitches and may have generally rectangular cross sectional configurations as indicated in FIG. 15B or, if desired, blazed generally triangular or checkmark-shaped configurations as indicated in FIG. 15C. Where the parallel grooves 72 are formed to have the generally triangular or checkmark-shaped configurations as indicated in FIG. 15C, it is preferable that such a cross sectional configuration of each of the grooves 54 is asymmetrical with respect to a plane which passes through the center of the groove 72 as previously noted with reference to FIG. 7A. Furthermore, the parallel grooves 72 formed in the screen plate 52 as indicated in FIG. 15A or FIG. 15B are preferably ruled so that the pitches of the grooves 72 are less than 50 microns or more preferably within a range of from 0.1 micron to 10 microns. The transmission viewing screen having such grooves 72 can also be manufactured in quantity from a replica prepared from a mother mother matrix as will be readily understood by those familiar with the art. While the transmission grating areas 68 and 68′ in the transmission viewing screen herein shown is formed by a surface portion of the screen plate 52 and is thus integral with the screen plate 52, such transmission grating areas 68 and 68′ may be formed separately of the screen plate 52 per se by a transparent or translucent member or members attached to the flat smooth inner surface of the screen plate 52 though not shown in the drawings.

When a divergent beam of light Lo incident on the transmission screen plate 52 having the transmission grating areas 68 and 68′ formed as hereinbefore described is transmitted through the parallel grooves 72 blazed in the screen plate 52, the light is caused to diffract inwardly toward a point aligned with the center axis C (FIG. 5) of the viewing screen 48 as will be seen from FIG. 8. The viewer E who may be situated in front of the transmission viewing screen 48 is thus enabled to clearly recognize the image produced by the convergent beam of light emanating from the viewing screen 48. The parallel grooves 72 forming the transmission grating areas 68 and 68′ being formed preferably at pitches less than 50 microns or more preferably within a range of 0.1 micron to 10 microns, no visible fringes which would otherwise give rise to a decrease in the resolution will be produced in the image produced by the beam of light passed through the grooves 72.

FIGS. 17A to 17D show other modifications of the embodiment hereinbefore described with reference to FIGS. 15A and 15B.

Figure 17A:
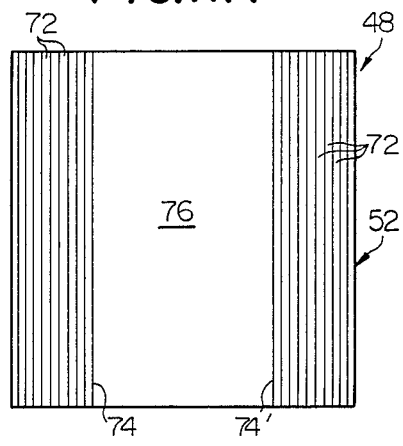
FIGS. 17A to 17D are frontal plan views showing other modifications of the embodiment illustrated in FIGS. 15A and 15B.

In the transmission viewing screen 48 illustrated in FIG. 17A, the screen plate 52 is formed with elongated left and right parallel-grooved transmission grating areas 74 and 74′ extending vertically along the left and right edges, respectively, of the screen plate 52 each between the upper and lower edges of the screen plate 52 and a central area 76 horizontally intervening between the left and right grooved transmission grating areas 74 and 74′ and devoid of the grooves 72. The parallel grooves 72 in each of the left and right grooved transmission grating areas 74 and 74′ extend vertically between the upper and lower edges of the screen plate 52.

Figure 17B:
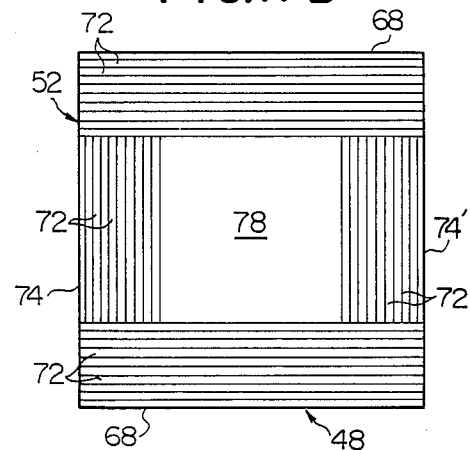

The transmission viewing screen 48 shown in FIG. 17B has elongated upper and lower parallel-grooved transmission grating areas 68 and 68′ extending horizontally along the upper and lower edges, respectively, of the screen plate 52 each between the left and right edges of the screen plate 52, left and right parallel-grooved transmission grating areas 74 and 74′ extending vertically along the left and right edges, respectively, of the screen plate 52 each between the upper and lower grooved transmission grating areas 68 and 68′. Thus, the transmission screen plate 52 of the viewing screen 48 shown in FIG. 17B has a central area 78 circumscribed by the upper and lower grooved transmission grating areas 68 and 68′ and left and right grooved transmission grating areas 74 and 74′ and devoid of the grooves 72. The parallel grooves 72 in each of the upper and lower grooved transmission grating areas 68 and 68′ extend horizontally between the left and right edges of the screen plate 52, while the parallel grooves 72 in each of the left and right grooved transmission grating areas 74 and 74′ extend vertically between the upper and lower grooved transmission grating areas 68 and 68′.

Figure 17C:
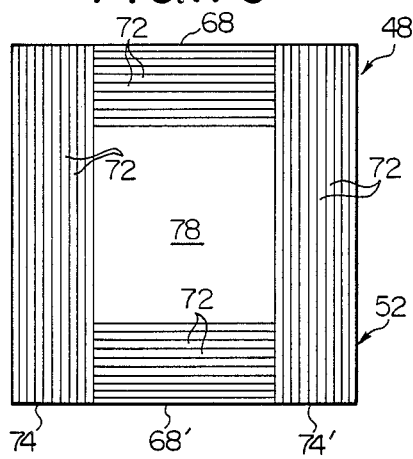

The transmission viewing screen 48 shown in FIG. 17C has elongated left and right parallel-grooved transmission grating areas 74 and 74′ extending vertically along the left and right edges, respectively, of the screen plate 52 each between the upper and lower edges of the screen plate 52, upper and lower parallel-grooved transmission grating areas 68 and 68′ extending horizontally along the upper and lower edges, respectively, of the screen plate 52 each between the left and right grooved transmission grating areas 74 and 74′. Thus, the transmission screen plate 52 of the viewing screen 48 shown in FIG. 17C also has a central area 78 circumscribed by the upper and lower grooved transmission grating areas 68 and 68′ and left and right grooved transmission grating areas 74 and 74′ and devoid of the grooves 72. The parallel grooves 72 in each of the left and right grooved transmission grating areas 74 and 74 extend vertically between the upper and lower edges of the screen plate 52, while the parallel grooves 72 in each of the upper and lower grooved transmission grating areas 68 and 68′ extend horizontally between the left and right grooved transmission grating areas 74 and 74′.

In each of the transmission grating arrangements shown in FIGS. 17B and 17C, the parallel grooves 72 formed in the upper and lower grooved transmission grating areas 68 and 68′ may be formed to have cross sectional configurations which are either similar to or different from those of the parallel grooves 72 formed in the left and right grooved transmission grating areas 74 and 74′. Thus, the grooves 7 in the upper and lower grooved transmission grating areas 68 and 68′ may be formed to have generally rectangular cross sectional configurations as shown in FIG. 15B while the grooves 72 in the left and right grooved transmission grating areas 74 and 74′ may be blazed to have generally triangular cross sectional configurations as shown in FIG. 15C. Alternatively, the grooves 72 in the upper and lower grooved transmission grating areas 68 and 68′ may be blazed to have generally triangular cross sectional configurations as shown in FIG. 15C while the grooves 72 in the left and right grooved transmission grating areas 74 and 74′ may be formed to have generally rectangular cross sectional configurations as shown in FIG. 15B. In each of these grating arrangements, it is preferable that the grooves 72 in one of the paired transmission grating areas such as the areas 68 and 68′ or the areas 74 and 74′ have cross sectional configurations similar to those of the grooves 72 in the other of the paired transmission grating areas.

Figure 17D:
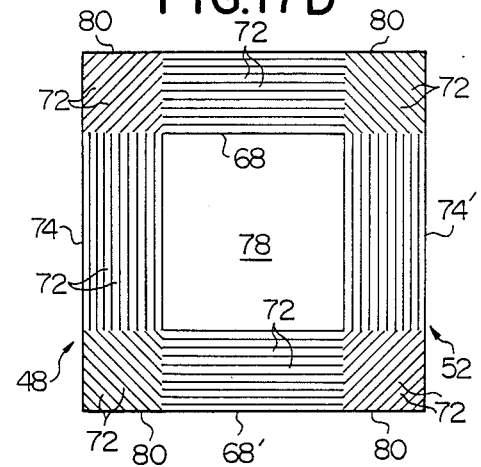

In the transmission viewing screen 48 illustrated in FIG. 17D, the screen plate 52 is formed with four generally square-shaped parallel-grooved corner transmission grating areas 80 respectively located at the four corners of the screen plate 48, an upper parallel-grooved transmission grating area 68 extending horizontally along the upper edge of the screen plate 52 between the upper two of the corner transmission grating areas 80, an lower parallel-grooved transmission grating area 68′ extending horizontally along the lower edge of the screen plate 52 between the lower two of -the corner transmission grating areas 80, a left parallel-grooved transmission grating area 74 extending vertically along the left edge of the screen plate 52 between the left two of the corner transmission grating areas 80, and a right parallel-grooved transmission grating area 74′ extending vertically along the right edge of the screen plate 52 between the right two of the corner transmission grating areas 80. Thus, the transmission screen plate 52 of the viewing screen 48 shown in FIG. 17C has a central area 78 circumscribed by the upper and lower grooved transmission grating areas 68 and 68′ and left and right grooved transmission grating areas 74 and 74′ and devoid of the grooves 72.

The parallel grooves 72 in each of the corner transmission grating areas 80 extend diagonally in the area 80 at the angle of 45 degrees to the two edges subtending the corner angle. The parallel grooves 72 in the upper grooved transmission grating area 68 extend horizontally between the upper two of the corner transmission grating areas 80 and the parallel grooves 72 in the lower grooved transmission grating area 68' extend horizontally between the lower two of the corner transmission grating areas 80. The parallel grooves 72 in the left grooved transmission grating area 74 extend vertically between the left two of the corner transmission grating areas 80 and the parallel grooves 72 in the right grooved transmission grating area 74' extend vertically between the right two of the corner transmission grating areas 80.

In the transmission grating arrangement shown in FIG. 17D, the parallel grooves 72 in each of the grooved transmission grating areas 68, 68', 74, 74' and 80 may be formed to have may be formed to have either rectangular or generally triangular cross sectional configurations as desired. Thus, the grooves 72 in each of the corner transmission grating areas 68 and 68' may be formed to have generally rectangular cross sectional configurations as shown in FIG. 15B while the grooves 72 in each of the other grooved transmission grating areas 68, 68', 74 and 74' may be blazed to have generally triangular cross sectional configurations as shown in FIG. 15C. Alternatively, the grooves 72 in each of the corner transmission grating areas 68 and 68' may be blazed to have generally triangular cross sectional configurations as shown in FIG. 15C while the grooves 72 in each of the other grooved transmission grating areas 68, 68', 74 and 74' may be formed to have generally rectangular cross sectional configurations as shown in FIG. 15B. In each of these grating arrangements, it is also preferable that the grooves 72 in one of the paired transmission grating areas such as the areas 68 and 68' or the areas 74 and 74' have cross sectional configurations similar to those of the grooves 72 in the other of the paired transmission grating areas.

When any of the embodiments of a transmission viewing screen according to the present invention as has been hereinbefore described with reference to FIGS. 15A to 15C and 17A to 17D, beams of light incident on the upper and lower transmission grating areas 68 and 68' will be caused to diffract downwardly and upwardly, respectively, and beams of light incident on the left and right transmission grating areas 74 and 74' will be caused to diffract rightwardly and leftwardly, respectively, past the transmission grating areas. Beams of light incident on the corner transmission grating areas 80 will be caused to diffract diagonally. The brightness of the image produced by the beams of light transmitted through the marginal areas of the transmission viewing screen will be more efficiently controlled through more minute segmentation of the areas.

The transmission grating areas provided in each of the embodiments herein before described with reference to FIGS. 17A to 17D may be formed by a surface portion of the screen plate 52 or may be formed separately of the screen plate 52 per se by a transparent or translucent member or members attached to the flat smooth inner surface of the screen plate 52 though not shown in the drawings.

Tenth Preferred Embodiment

FIGS. 18A and 18B show a tenth preferred embodiment of a transmission viewing screen according to the present invention. The transmission viewing screen herein shown also comprises a screen plate 52 having a flat smooth outer surface 52a and a grooved inner surface 52b. The grooved inner surface 52b of the screen plate 52 has elongated upper and lower grooved transmission grating areas 82 and 82' extending horizontally along the upper and lower edges, respectively, of the screen plate 52 each between the left and right edges of the screen plate 52 and a central area 84 vertically intervening between the upper and lower grooved transmission grating areas 82 and 82' and devoid of grooves to form the transmission grating. The embodiment herein shown is thus characterized in that the central area 84 between the upper and lower grooved transmission grating areas 82 and 82' is left plain with no grooves formed in the area 84 in view of the fact that the distribution of light is higher in a center area than in marginal areas of the transmission viewing screen.

Each of the upper and lower grooved transmission grating areas 82 and 82' is formed with straight, parallel grooves 86 extending horizontally between the left and right edges of the screen plate 52. The parallel grooves 86 are formed at pitches which progressively increase from the upper edge of the screen plate 52 downwardly for the grooves 6 in the transmission grating area 82 or from the lower edge of the screen plate 52 upwardly for the grooves 86 in the transmission grating area 82'. These parallel grooves 6 may have generally rectangular cross sectional configurations as indicated in FIG. 18B or, if desired, blazed generally triangular or checkmark-shaped configurations as indicated in FIG. 18C. Where the parallel grooves 86 are formed to have the generally triangular or checkmark-shaped configurations as indicated in FIG. 18C, it is preferable that such a cross sectional configuration of each of the grooves 54 is asymmetrical with respect to a plane which passes through the center of the groove 86 as previously noted with reference to FIG. 7A. Furthermore, the parallel grooves 86 formed in the screen plate 52 as indicated in FIG. 18A or FIG. 18B are preferably ruled so that the pitches of the grooves 86 are less than 50 microns or more preferably within a range of from 0.1 micron to 10 microns. While the transmission grating areas 82 and 82' in the transmission viewing screen herein shown is formed by a surface portion of the screen plate 52 and is thus integral with the screen plate 52, such transmission grating areas 82 and 82' may be formed separately of the screen plate 52 per se by a transparent or translucent member or members attached to the flat smooth inner surface of the screen plate 52 though not shown in the drawings.

FIGS. 19A to 19D show other modifications of the embodiment described with reference to FIGS. 18A and 18B.

In the transmission viewing screen 48 illustrated in FIG. 19A, the screen plate 52 is formed with elongated left and right parallel-grooved transmission grating areas 88 and 88' extending vertically along the left and right edges, respectively, of the screen plate 52 each between the upper and lower edges of the screen plate 52 and a central area 90 horizontally intervening between the left and right grooved transmission grating areas 88 and 88' and devoid of the grooves 86. The parallel grooves 86 in each of the left and right grooved transmission grating areas 88 and 88' extend vertically between the upper and lower edges of the screen plate 52.

The transmission viewing screen 48 shown in FIG. 19B has elongated upper and lower parallel-grooved transmission grating areas 82 and 82' extending horizontally along the upper and lower edges, respectively, of the screen plate 52 each between the left and right edges of the screen plate 52, left and right parallel-grooved transmission grating areas 88 and 88' extending vertically along the left and right edges, respectively, of the screen plate 52 each between the upper and lower grooved transmission grating areas 82 and 82'. Thus, the transmission screen plate 52 of the viewing screen 48 shown in FIG. 19B has a central area 92 circumscribed by the upper and lower grooved transmission grating areas 82 and 82' and left and right grooved transmission grating areas 88 and 88' and devoid of the grooves 86. The parallel grooves 86 in each of the upper and lower grooved transmission grating areas 82 and 82' extend horizontally between the left and right edges of the screen plate 52, while the parallel grooves 86 in each of the left and right grooved transmission grating areas 88 and 88' extend vertically between the upper and lower grooved transmission grating areas 82 and 82'.

The transmission viewing screen 48 shown in FIG. 19C has elongated left and right parallel-grooved transmission grating areas 88 and 88' extending vertically along the left and right edges, respectively, of the screen plate 52 each between the upper and lower edges of the screen plate 52, upper and lower parallel-grooved transmission grating areas 82 and 82' extending horizontally along the upper and lower edges, respectively, of the screen plate 52 each between the left and right grooved transmission grating areas 88 and 88'. Thus, the transmission screen plate 52 of the viewing screen 48 shown in FIG. 19C also has a central area 92 circumscribed by the upper and lower grooved transmission grating areas 82 and 82' and left and right grooved transmission grating areas 88 and 88' and devoid of the grooves 86. The parallel grooves 86 in each of the left and right grooved transmission grating areas 88 and 88 extend vertically between the upper and lower edges of the screen plate 52, while the parallel grooves 86 in each of the upper and lower grooved transmission grating areas 82 and 82' extend horizontally between the left and right grooved transmission grating areas 88 and 88'.

In each of the transmission grating arrangements shown in FIGS. 19B and 19C, the parallel grooves 86 formed in the upper and lower grooved transmission grating areas 82 and 2' may be formed to have cross sectional configurations which are either similar to or different from those of the parallel grooves 86 formed in the left and right grooved transmission grating areas 88 and 88'. Thus, the grooves 86 in the upper and lower grooved transmission grating areas 82 and 82' may be formed to have generally rectangular cross sectional configurations as shown in FIG. 18B while the grooves 86 in the left and right grooved transmission grating areas 88 and 88' may be blazed to have generally triangular cross sectional configurations as shown in FIG. 8C. Alternatively, the grooves 86 in the upper and lower grooved transmission grating areas 82 and 82' may be blazed to have generally triangular cross sectional configurations as shown in FIG. 18C while the grooves 86 in the left and right grooved transmission grating areas 88 and 88' may be formed to have generally rectangular cross sectional configurations as shown in FIG. 18B. In each of these grating arrangements, it is preferable that the grooves 86 in one of the paired transmission grating areas such as the areas 82 and 82' or the areas 88 and 88' have cross sectional configurations similar to those of the grooves 86 in the other of the paired transmission grating areas.

In the transmission viewing screen 48 illustrated in FIG. 19D, the screen plate 52 is formed with four generally square-shaped parallel-grooved corner transmission grating areas 94 respectively located at the four corners of the screen pate 48, an upper parallel-grooved transmission grating area 82 extending horizontally along the upper edge of the screen plate 52 between the upper two of the corner transmission grating areas 94, an lower parallel-grooved transmission grating area 82' extending horizontally along the lower edge of the screen plate 52 between the lower two of the corner transmission grating areas 94, a left parallel-grooved transmission grating area 88 extending vertically along the left edge of the screen plate 52 between the left two of the corner transmission grating areas 94, and a right parallel-grooved transmission grating area 88' extending vertically along the right edge of the screen plate 52 between the right two of the corner transmission grating areas 94. Thus, the transmission screen plate 52 of the viewing screen 48 shown in FIG. 19C has a central area 92 circumscribed by the upper and lower grooved transmission grating areas 82 and 82' and left and right grooved transmission grating areas 88 and 88' and devoid of the grooves 86.

The parallel grooves 86 in each of the corner transmission grating areas 94 extend diagonally in the area 94 at the angle of 45 degrees to the two edges subtending the corner angle. The parallel grooves 86 in the upper grooved transmission grating area 82 extend horizontally between the upper two of the corner transmission grating areas 94 and the parallel grooves 86 in the lower grooved transmission grating area 82' extend horizontally between the lower two of the corner transmission grating areas 94. The parallel grooves 86 in the left grooved transmission grating area 88 extend vertically between the left two of the corner transmission grating areas 94 and the parallel grooves 86 in the right grooved transmission grating area 88' extend vertically between the right two of the corner transmission grating areas 94.

In the transmission grating arrangement shown in FIG. 19D, the parallel grooves 86 in each of the grooved transmission grating areas 82, 82', 88, 88' and 94 may be formed to have may be formed to have either rectangular or generally triangular cross sectional configurations as desired. Thus, the grooves 86 in each of the corner transmission grating areas 82 and 82' may be formed to have generally rectangular cross sectional configurations as shown in FIG. 18B while the grooves 86 in each of the other grooved transmission grating areas 82, 82', 88 and 88' may be blazed to have generally triangular cross sectional configurations as shown in FIG. 18C. Alternatively, the grooves 86 in each of the corner transmission grating areas 82 and 82' may be blazed to have generally triangular cross sectional configurations as shown in FIG. 18C while the grooves 86 in each of the other grooved transmission grating areas 82, 82', 88 and 88' may be formed to have generally rectangular cross sectional configurations as shown in FIG. 18B. In each of these grating arrangements, it is also preferable that the grooves 86 in one of the paired transmission grating areas such as the areas 82 and 82' or the areas 88 and 88' have cross sectional configurations similar to those of the grooves 86 in the other of the paired transmission grating areas.

When any of the embodiments of a transmission viewing screen according to the present invention as has been hereinbefore described with reference to FIGS. 18A to 18C and 19A to 19D, beams of light incident on the upper and lower transmission grating areas 82 and 82' will be caused to diffract downwardly and upwardly, respectively, and beams of light incident on the left and right transmission grating areas 88 and 88' will be caused to diffract rightwardly and leftwardly, respectively. Beams of light incident on the corner transmission grating areas 94 will be caused to diffract diagonally. The brightness of the image produced by the beams of light transmitted through the marginal areas of the transmission viewing screen will be more efficiently controlled through more minute segmentation of the areas.

The transmission grating areas provided in each of the embodiments herein before described with reference to FIGS. 19A to 19D may be formed by a surface portion of the screen plate 52 or may be formed separately of the screen plate 52 per se by a transparent or translucent member or members attached to the flat smooth inner surface of the screen plate 52 though not shown in the drawings.

What is claimed is:

1. A light-transmission viewing screen for displaying an optical image from a beam of light projected thereon along a predetermined path of light provided rearwardly of the screen, the viewing screen having a virtual center axis extending toward a viewer's viewing position, said light-transisission viewing screen comprising
   (a) a transparent or translucent transmission screen plate through which to transmit said beam of light, and
   (b) a transmission grating located on at least a portion of one of said surfaces of the transmission screen plate for diffracting the beam of light toward a location substantially aligned with the virtual center axis of the viewing screen.

2. A light-transmission viewing screen as set forth in claim 1, in which said transmission grating is formed by a portion of one of said surfaces of said transmission screen plate.

3. A light-transmission viewing screen as set forth in claim 1, in which said transmission grating is formed separately of said screen plate and is securely attached to least a portion of one of said surfaces of said transmission screen plate.

4. A light-transmission viewing screen as set forth in claim 1, in which said transmission grating comprises a succession of concentric grooves formed in least a portion of one of said surfaces of said transmission screen plate and having a common virtual center axis which is substantially coincident with said virtual center axis of the viewing screen.

5. A light-transmission viewing screen as set forth in claim 4, in which said concentric grooves are formed at pitches of less than 50 microns.

6. A light-transmission viewing screen as set forth in claim 5, in which said concentric grooves are formed at pitches within a range of from 0.1 micron to 10 microns.

7. A light-transmission viewing screen as set forth in claim 4, in which said concentric grooves are formed at pitches which increase progressively toward said common virtual center axis of the concentric grooves for defining Fresnel zones in said transmission grating.

8. A light-transmission viewing screen as set forth in claim 7, in which said concentric grooves are blazed so that the intensity of light of the first-order spectrum is greater than those of the other spectra.

9. A light-transmission viewing screen as set forth in claim 8, in which said concentric grooves have blaze angles which decrease progressively toward said common virtual center axis of the concentric grooves.

10. A light-transmission viewing screen as set forth in claim 8, in which said concentric grooves have blaze angles which are substantially equal for all of the concentric grooves.

11. A light-transmission viewing screen as set forth in claim 7, in which each of said concentric grooves has a substantially rectangular cross sectional configuration.

12. A light-transmission viewing screen as set forth in claim 4, in which said concentric grooves are formed at pitches which are substantially equal for all of the concentric grooves.

13. A light-transmission viewing screen as set forth in claim 12, in which said concentric grooves are blazed so that the intensity of light of the first-order spectrum is greater than those of the other spectra.

14. A light-transmission viewing screen as set forth in claim 13, in which said concentric grooves have blaze angles which decrease progressively toward said common virtual center axis of the concentric grooves.

15. A light-transmission viewing screen as set forth in claim 13, in which said concentric grooves have blaze angles which are substantially equal for all of the concentric grooves.

16. A light-transmission viewing screen as set forth in claim 4, in which said transmission screen plate has substantially parallel upper and lower edges and in which said transmission grating has portions respectively located adjacent said upper and lower edges of the screen plate.

17. A light-transmission viewing screen as set forth in claim 6, in which said transmission screen plate has substantially parallel left and right edges and in which said transmission grating has portions respectively located adjacent said left and right edges of the screen plate.

18. A light-transmission viewing screen as set forth in claim 1, in which said transmission grating comprises a succession of substantially straight parallel grooves formed in least a portion of one of said surfaces of said transmission screen plate.

19. A light-transmission viewing screen as set forth in claim 18, in which said parallel grooves are formed at pitches of less than 50 microns.

20. A light-transmission viewing screen as set forth in claim 19, in which said parallel grooves are formed at pitches within a range of from 0.1 micron to 10 microns.

21. A light-transmission viewing screen as set forth in claim 18, in which each of said parallel grooves has a substantially rectangular cross sectional configuration.

22. A light-transmission viewing screen as set forth in claim 21, in which said parallel grooves are formed at pitches which are substantially equal for all of the parallel grooves.

23. A light-transmission viewing screen as set forth in claim 21, in which said parallel grooves are formed at pitches which increase progressively toward said virtual center axis of the viewing screen.

24. A light-transmission viewing screen as set forth in claim 18, in which said parallel grooves are blazed so that the intensity of light of the first-order spectrum is greater than those of the other spectra.

25. A light-transmission viewing screen as set forth in claim 24, in which said parallel grooves are formed at pitches which are substantially equal for all of the parallel grooves.

26. A light-transmission viewing screen as set forth in claim 24, in which said parallel grooves are formed at pitches which increase progressively toward said virtual center axis of the viewing screen.

27. A light-transmission viewing screen as set forth in claim 18, in which said transmission screen plate has at least one pair of substantially parallel edges and in which said transmission grating has portions respectively located adjacent said edges of the screen plate.

28. A light-transmission viewing screen as set forth in claim 4, in which said transmission grating has a center area devoid of said concentric grooves.

29. A light-transmission viewing screen as set forth in claim 28, in which said center area of said transmission grating has a radius of less than 100 mm from said common virtual center axis of the concentrical grooves.

30. A light-transmission viewing screen as set forth in claim 18, in which said transmission grating has a center area devoid of said parallel grooves.

31. A light-transmission viewing screen as set forth in claim 4, in which said concentric grooves are grouped into those of two or more annular zones including a radially outer annular zone and a radially inner annular zone, the concentric grooves in the outer and inner annular zones being blazed such that the grooves in each of the annular zones have equal blaze angles which are different from those of the grooves of the other zone.

32. A light-transmission viewing screen as set forth in claim 31, in which the blaze angles of the grooves in said inner annular annular zone are less than the blaze angles of the grooves in said radially outer annular zone.

33. A light-transmission viewing screen as set forth in claim 32, in which the concentric grooves in said two or more annular zones are formed at pitches which increase progressively toward said common virtual center axis of the concentric grooves for defining Fresnel zones in said transmission grating.

34. A light-transmission viewing screen as set forth in claim 32, in which said concentric grooves in said two or more annular zones are blazed such that the grooves in each of the annular zones have substantially equal pitches which are different from the pitches of the concentric grooves in another annular zone.

35. A light-transmission viewing screen as set forth in claim 32, in which said concentric grooves in said two or more annular zones are blazed such that the grooves in each of the annular zones have substantially equal pitches which are substantially equal to the pitches of the concentric grooves in another annular zone.

36. A light-transmission viewing screen as set forth in claim 32, in which the concentrical grooves in each of the annular zones are formed at pitches equal to the pitch of the groove located centrally of the particular zone and identical with the pitch to define a Fresnel zone.

37. A light-transmission viewing screen as set forth in claim 32, in which said concentric grooves are grouped into those of two or more annular zones including a radially outer annular zone and a radially inner annular zone, the concentric grooves in the outer and inner annular zones being blazed such that the grooves in each of the annular zones have substantially equal blaze angles which are substantially equal to the blaze angles of the concentric grooves in the other zone and substantially equal pitches which are different from the pitches of the concentric grooves in the other annular zone.

38. A light-transmission viewing screen as set forth in claim 32, in which the concentrical grooves in each of said two or more annular zones are formed at pitches equal to the pitch of the groove located centrally of the zone and identical with the pitch to define a Fresnel zone.

39. A light-transmission viewing screen as set forth in claim 18, in which said transmission screen plate has substantially parallel upper and lower edges and in which said transmission grating has upper and lower portions respectively located adjacent said upper and lower edges of the screen plate, the parallel grooves in each of said upper and lower portions of the transmission grating extending substantially in parallel with said upper and lower edges.

40. A light-transmission viewing screen as set forth in claim 39, in which the parallel grooves in each of said upper and lower portions of the transmission grating have substantially equal pitches.

41. A light-transmission viewing screen as set forth in claim 39, in which the parallel grooves in said upper portion of the transmission grating have pitches which increase away from said upper edge and the parallel grooves in said lower portion of the transmission grating have pitches which increase away from said lower edge.

42. A light-transmission viewing screen as set forth in claim 18, in which said transmission screen plate has substantially parallel left and right edges and in which said transmission grating has portions respectively located adjacent said left and right edges of the screen plate, the parallel grooves in each of said left and right portions of the transmission grating extending substantially in parallel with said left and right edges.

43. A light-transmission viewing screen as set forth in claim 42, in which the parallel grooves in each of said left and right portions of the transmission grating have substantially equal pitches.

44. A light-transmission viewing screen as set forth in claim 42, in which the parallel grooves in said left portion of the transmission grating have pitches which increase away from said left edge and the parallel grooves in said right portion of the transmission grating have pitches which increase away from said right edge.

45. A light-transmission viewing screen as set forth in claim 18, in which said transmission screen plate has substantially parallel upper and lower edges and substantially parallel left and right edges and in which transmission grating has upper and lower portions respectively located adjacent said left and right edges of the screen plate and left and right portions respectively located adjacent said left and right edges of the screen plate, the parallel grooves in each of said upper and lower portions of the transmission grating extending substantially in parallel with said upper and lower edges and the parallel grooves in each of said left and right portions of the transmission grating extending substantially in parallel with said left and right edges.

46. A light-transmission viewing screen as set forth in claim 45, in which each of the parallel grooves in each of said upper and lower portions of the transmission grating has a substantially rectangular cross sectional configuration and each of the parallel grooves in each of said left and right portions of the transmission grating is blazed so that the intensity of light of the first-order spectrum is greater than those of the other spectra.

47. A light-transmission viewing screen as set forth in claim 45, in which each of the parallel grooves in each of said upper and lower portions of the transmission grating is blazed so that the intensity of light of the first-order spectrum is greater than those of the other spectra and each of the parallel grooves in each of said left and right portions of the transmission grating has a substantially rectangular cross sectional configuration.

48. A light-transmission viewing screen as set forth in claim 45, in which the parallel grooves in each of said left and right portions of the transmission grating have substantially equal pitches.

49. A light-transmission viewing screen as set forth in claim 45, in which the parallel grooves in said upper portion of the transmission grating have pitches which increase away from said upper edge, the parallel grooves in said lower portion of the transmission grating have pitches which increase away from said lower edge, the parallel grooves in said left portion of the transmission grating have pitches which increase away from said left edge and the parallel grooves in said right portion of the transmission grating have pitches which increase away from said right edge.

50. A light-transmission viewing screen as set forth in claim 45, in which said transmission grating further has four corner portions respectively located adjacent the four corners of the screen plate, said upper portion of the transmission grating extending between the upper two of said corner portions, said lower portion of the transmission grating extending between the lower two of said corner portions, said left portion of the transmission grating extending between the left two of said corner portions, said right portion of the transmission grating extending between the right two of said corner portions.

51. A light-transmission viewing screen as set forth in claim 50, in which the parallel grooves in each of said corner portions of the transmission grating extend diagonally at an angle of 45 degrees to the two edges subtending the corner angle.

* * * * *